July 16, 1946.  J. J. HEIGL ET AL  2,404,064
APPARATUS FOR INVESTIGATING ABSORPTION SPECTRA OF SUBSTANCES
Filed Dec. 31, 1943  3 Sheets-Sheet 1

John J. Heigl &
James A. Wilson  Inventors
By  Attorney

July 16, 1946.    J. J. HEIGL ET AL    2,404,064
APPARATUS FOR INVESTIGATING ABSORPTION SPECTRA OF SUBSTANCES
Filed Dec. 31, 1943    3 Sheets-Sheet 3

John J. Heigl
James G. Wilson    Inventors
B. _____ Attorney

Patented July 16, 1946

2,404,064

UNITED STATES PATENT OFFICE 2,404,064

APPARATUS FOR INVESTIGATING ABSORPTION SPECTRA OF SUBSTANCES

John J. Heigl, Cranford, and James A. Wilson, Linden, N. J., assignors to Standard Oil Development Company, a corporation of Delaware Application December 31, 1943, Serial No. 516,348

9 Claims. (Cl. 250—43)

This invention relates to improvements in apparatus for analyzing fluid mixtures by means of the absorption spectra of their components, and relates more particularly to apparatus for more rapidly and accurately recording the results of such analyses.

It has long been recognized that various substances have the power of absorbing energy from electromagnetic rays of various wave lengths. This is due to electronic, rotational, or vibrational changes in the energy of a molecule. Changes in the electronic energy cause either emission or absorption in the ultra violet or visible spectrum. Such spectra have been widely used as an analytical tool.

Changes in the rotational energies of a molecule give rise to spectra which appear in the far infrared. This region is not used often for analysis because of the difficulty in experimental technique.

Spectra caused by changes in the vibrational energies of molecules appear in the near infrared and extend from 2 mu to 30 mu. This region is particularly useful when studying the absorption spectra of hydrocarbons. Because the absorption bands in this region can be correlated with the normal vibrations of the molecule considered as a dynamical system, it is possible to distinguish between different types of atoms, different types of bonds, and differences in the relative position between the atoms. As a result it has been found that similar groups in different molecules will cause absorption at the same wave lengths, a phenomenon which gives rise to certain spectral positions characteristic of certain bonds or molecular groupings.

A further extension of the above principles has resulted in methods for the routine quantitative spectrometric analysis of two or more components of a mixture. For example, this has been accomplished by placing a sample of a substantially pure substance in the absorption cell of a spectrometer, such as a Littrow spectrometer, passing the band of the infrared spectrum through the substance in a path of predetermined length, resolving the spectrum after its passage through the substance into its various wave lengths, selecting a desired wave length by placing a slit in the path of the resolved spectrum and focusing it on a sensitive element, such as a thermocouple or a photo electric cell connected with a recording device such as a galvanometer. Automatic scanning of the resolved spectrum may be accomplished by slowly moving the prism of the spectroscope back and forth so that the resolved spectrum moves over the selector slit. The deflection of the galvanometer may be recorded photographically or on a recording potentiometer or the like.

Such analytical processes lend themselves to the control of various industrial processes for which purpose the results must be obtained rapidly and accurately.

It is therefore one object of the present invention to provide rapid and accurate means for measuring the characteristic absorption spectra of constituents which it is desired to control.

Another object of this invention is to provide means whereby the percentage of a desired component in a mixture may be readily and directly recorded.

According to the present invention the mixture to be analyzed is placed in the absorption cell of a spectrometer and an absorption band of the constituent which it is desired to control is selected which does not fall too close to the bands of the remaining constituents. This band is then scanned by passing it slowly over slits of selected width and the band from each slit is focused on a separate sensitive element, such as a thermocouple and the energy thus picked up is recorded by a meter which reads directly in percentage of the desired component being controlled. For sake of clarity a suitable apparatus is illustrated in the accompanying drawings in which:

The invention will now be described in detail with reference to the measurement of isobutylene for purposes of industrial control. This description is to be considered illustrative only, and in no way a limitation of the application of the invention.

Figure 1:
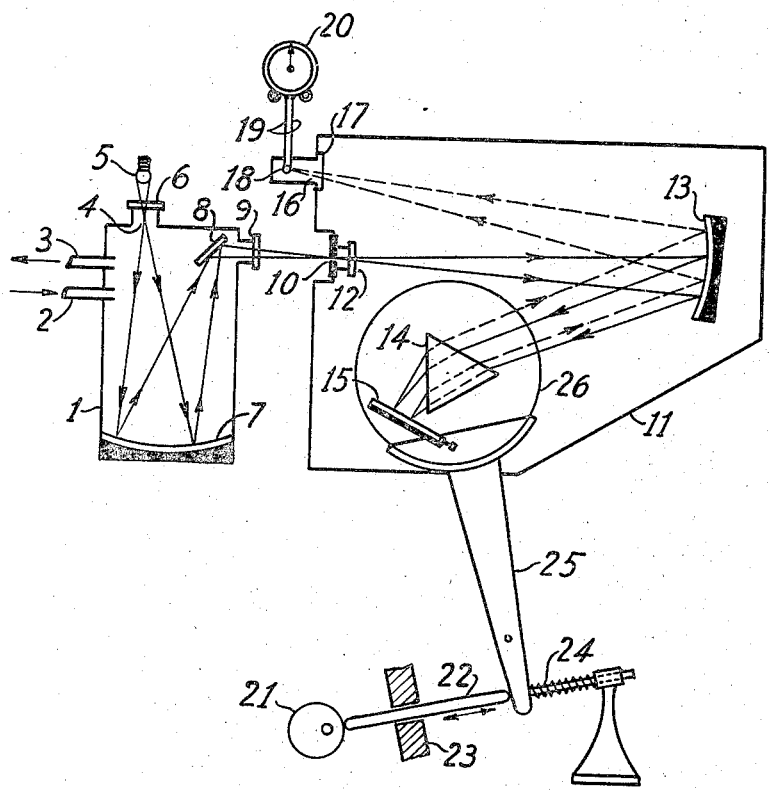
Figure 1 is a plan view showing the path of a beam of light and method of scanning the desired spectral range.

Referring to Figure 1, 1 is an absorption cell having inlet 2 and outlet 3 for the sample of isobutylene to be tested. At one end of the absorption cell is a slit 4, through which pass infrared rays from a source 5 such as a Nernst glower. This slit is covered with a halide window 6. In the opposite end of cell 1 is a gold sputtered, spherical mirror 7 which receives the rays from glower 5 and reflects them back to a mirror 8. This mirror deflects the rays through a halite window 9 in the side of cell 1.

The rays then pass through an adjustable slit 10 in the wall 11 of the spectroscope. Slit 10 is covered by halite window 12. From the slit 10 the rays are directed onto a second gold sputtered mirror 13 parabolized off its axis, which in turn reflects them to a triangular resolving prism 14 through which they are refracted to a pivoted mirror 15, which in turn reflects them back to the prism 14, which refracts them back to the mirror 13, which reflects them through adjustable slits represented generally at 16 in the wall 11 of the spectroscope, covered by a halite window 17, to thermocouples 18. The slits 16 and thermocouples 18 are illustrated more in detail in Figures 2 and 3 described below.

In passing through prism 14 the rays are broken up into their component wave lengths and only a narrow band is allowed to pass through slits 16. However, the particular band passing through the slits can be continuously changed by rocking the prism 14 back and forth through a narrow arc. This is accomplished by means of cam 21, which is rotated by a motor of constant speed (not shown). The rotation of cam 21 causes pin 22 to move back and forth through guide 23. Spring 24 is arranged to press against lever 25 attached to prism housing 26 so that lever 25 is caused to follow the movement of pin 22. This causes the prism housing and prism 14 contained therein to rotate through a small arc which results in the entire band of refracted radiation from prism 14 to pass over the exit slits 16. Thermocouples 18 receive the energy through slits 16 and convert it into electrical energy which is indicated on meter 20 as percentage of isobutylene in the sample in absorption cell 1.

Figure 2:
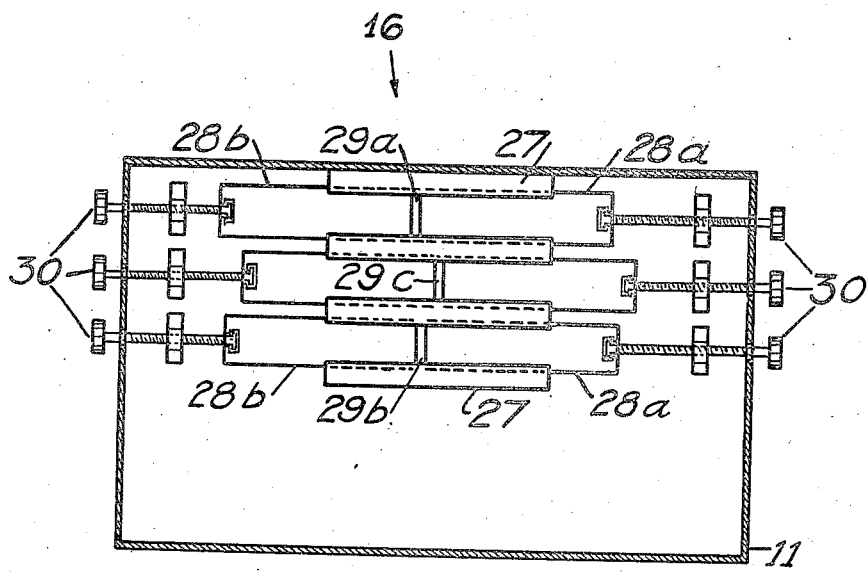
Figure 2 is a detailed view of the slit arrangement which forms one of the features of this invention.
Figure 3:
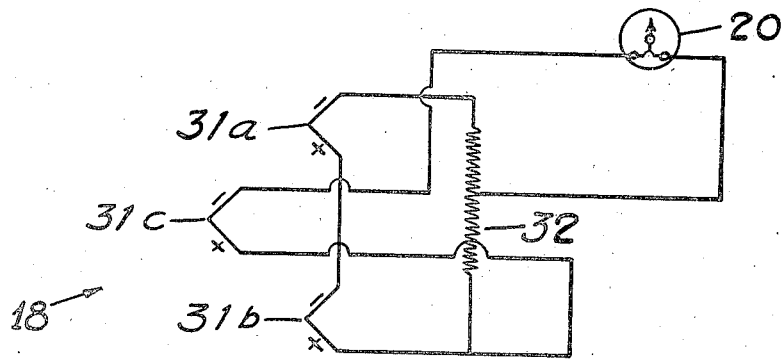
Figure 3 is a detailed view of the thermocouple circuit which forms another feature of this invention.

Referring to Figures 2 and 3, slits shown generally as 16 in Figure 1 are shown here as a part of the wall 11 of the spectroscope which is provided with guides 27 adapted to hold opposed sliding panels 28a and 28b, adjusted so as to form slits 29a, 29b, and 29c. Micrometer screws 30 are provided for adjusting panels 28a and 28b in through guides 27 to form slits of the desired width. By this arrangement there is provided three slits which are adjustable as to width and which can be moved relative to each other by means of micrometer screws 30. Behind each of the slits 29a, 29b and 29c is placed a thermocouple 31a, 31b and 31c, respectively, which are shown collectively as 18 in Figure 1. These thermocouples may be mounted on the sliding panels 28 or in any other desired manner so as to always be in a position to receive the energy passing through the respective slits at any desired position. Thermocouples 31a and 31b are connected in series negative to positive through a resistance 32. The midpoint of resistance 32 is connected through galvanometer 20 with the negative pole of thermocouple 31c, the positive pole of which is connected with the positive pole of thermocouple 31b.

Figure 4:
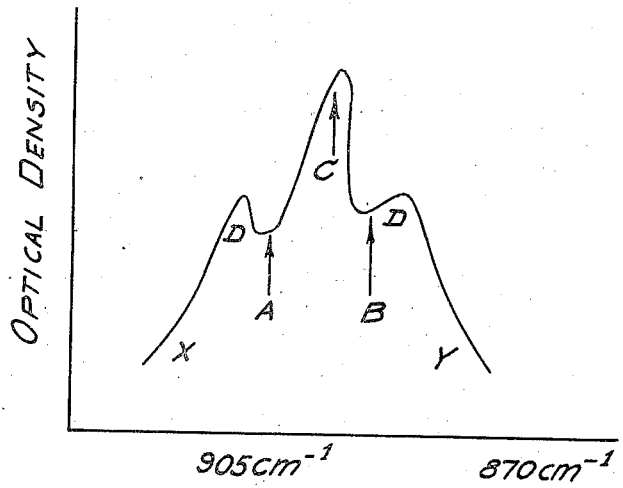
Figure 4 is an absorption curve for isobutylene.

As shown in Figure 4 isobutylene has an absorptive curve in the 11—12 micron region of the infrared spectrum, and when it is desired to determine the amount of this compound in a mixture, a wave length band corresponding to the points X—Y on the curve shown in Figure 4 is selected as the desired absorption band with the result that the curve showing the characteristic absorption exhibited by isobutylene is obtained as illustrated in Figure 4. The height of the peak C relative to the average height of the valleys A and B is a function of the concentration of isobutylene and is a special case of the relation expressed by the well known Beer's law where the log $$\frac{I_0}{I} = \text{optical density}.$$

In the present case $$\frac{A+B}{2} \text{ equals } I_0$$

and $C=I$. The concentration of isobutylene, therefore, can be determined by the equation $$\frac{A+B}{2C} = \text{concentration of isobutylene}.$$

Other compounds which may be present contribute to the general background D, but generally do not affect the relation between A, B and C.

Ordinarily when using a single slit, as the spectrum is scanned the indicating needle of the meter 20 indicates first a maximum value corresponding to point A on the curve of Figure 4, then a minimum corresponding to the point C and finally a second maximum corresponding to point B. The maxima corresponding to points A and B are usually different values and an average value must be computed therefrom. Ordinarily this has been done by simple calculation after each of the single values have been obtained, but since during routine operations involving a large number of tests the time consumed is relatively large, the present invention provides a simple and rapid means for obtaining the average value by virtue of which the percentage of isobutylene can be read directly from the meter. According to this invention, therefore, exit slit 29c is set to a position in the spectrum where isobutylene has an absorption peak indicated by C in the curve of Figure 4 while slits 29a and 29b are set at positions corresponding to points A and B of the curve. Thermocouples 31a and 31b are connected in series through resistance 26 and balanced against thermocouple 31c, minus to minus and plus to plus, through galvanometer 20 and the midpoint of resistance 32 as shown in Figure 3. In this manner a value corresponding to the average of valleys A and B is balanced against the value corresponding to peak C so that a result equal to $$\frac{A+B}{2C}$$

is obtained from the reading of galvanometer 20, which by properly calibrating galvanometer 20 can be read as per cent isobutylene directly. In this manner a rapid and accurate control can be maintained on any process in which the amount of isobutylene is of importance. For example, such a means may be used to measure the amount of isobutylene in certain fractions obtained by the distillation of hydrocarbons or in the product from an isomerization process. Likewise it may be applied to other processes such as aviation gasoline or synthetic rubber manufacture where it is desired to keep close control over the feed into or products from these processes. It is not only useful for the control of isobutylene but also for other hydrocarbons, such as isobutane, butadiene and the like, and equally well for any other compounds which give a characteristic absorption spectrum. The arrangement of slits and thermocouple circuits described in this invention may also be coordinated with control instruments in the plant to regulate the chemical composition of any stream in which it is desired to control.

It should be emphasized that in certain cases interfering material may be present which would cause the value of height of the point C in the curve of Figure 4 to give an inaccurate result in the final reading. In such a case correction is applied to the reading thus obtained by measuring for the interfering material at another wave length and the percentage of the interfering material is subtracted from the original reading for the percentage of the material being controlled. This correction may also be obtained by placing one or more additional slits in the path of the resolved beam where such interfering bands occur, providing thermocouples behind each of these slits to receive the energy from these bands and connecting these thermocouples in opposition to the circuit or circuits containing the thermocouples receiving the desired band corresponding to the peak C. For example, such a correction would have to be applied when analyzing the isobutylene in a C-4 cut also containing normal butane and/or cis-butene-2. However, if a series of analyses are being made in which the percentage of the interfering material is constant and known, the scale of the meter can be so calculated as to take this into consideration.

It is also within the scope of this invention to provide a large number of slits in the path of a wide band of radiation where several peaks occur due to the desired component. In such a case the thermocouples receiving the energy from those slits through which the desired bands pass will be connected in series and those behind the slits through which the undesired bands pass will likewise be connected in series. The two circuits will then be connected in opposition so that the average of one will be balanced against the average of the other to get the desired ratio.

The nature and objects of the present invention having thus been set forth and a specific embodiment of the same given, what is claimed as new and useful and desired to be secured by Letters Patent is:

1. An apparatus for determining the amount of one component of a mixture by the characteristic absorption spectra of said component comprising in combination a source of radiation, means for passing said radiation through said mixture, means for resolving unabsorbed radiation after its passage through said mixture into its component wave lengths, means for scanning said resolved radiation, means for selecting a plurality of bands from said scanned radiation, means for converting each of said bands into electrical energy, means for obtaining an averaged value of any desired number of said energies, and means for balancing said averaged value against the averaged value of the remaining energies.

2. An apparatus for determining the amount of one component of a mixture by the characteristic absorption spectra of said component comprising in combination a source of radiation, means for passing said radiation through said mixture, means for resolving unabsorbed radiation after its passage through said mixture into its component wave lengths, means for scanning said resolved radiation, means for selecting a plurality of bands from said scanned radiation, means for converting each of said bands into electrical energy, means for obtaining an averaged value of all but one of said electrical energies and means for balancing said averaged value against said remaining energy.

3. An apparatus for determining the amount of one component of a mixture by the characteristic absorption spectra of said component comprising in combination a source of radiation, means for passing said radiation through said mixture, means for resolving unabsorbed radiation after its passage through said mixture into its component wave lengths, means for scanning said resolved radiation, a plurality of relatively movable slits for selecting a plurality of bands from said scanned radiation, means for obtaining an averaged value of all but one of said electrical energies, means for balancing said averaged value against said remaining energy and means responsive to said balancing means for recording directly the amount of the desired component.

4. An apparatus for determining the amount of one component of a mixture by the characteristic absorption spectra of said component comprising in combination a source of infra-red radiation, means for passing said radiation through said mixture, means for resolving unabsorbed radiation after its passage through said mixture into its component wave lengths, means for scanning said resolved radiation, a plurality of movable slits for selecting a plurality of bands from said scanned radiation, a thermocouple cooperating with each of said slits for converting each of said bands into electrical energy, means for obtaining an averaged value from any desired number of said thermocouples, means for balancing said averaged value against the averaged value of said remaining energies, and means responsive to said balancing means for recording directly the amount of the desired component in the mixture.

5. An apparatus for determining the amount of one component of a mixture by the characteristic absorption spectra of said component comprising in combination a source of infra-red radiation, means for passing said radiation through said mixture, means for resolving unabsorbed radiation after its passage through said mixture into its component wave lengths, means for scanning said resolved radiation, a plurality of movable slits for selecting a plurality of bands from said scanned radiation, a thermocouple cooperating with each of said slits for converting each of said bands into electrical energy, means for obtaining an averaged electrical value from all but one of said thermocouples, means for balancing said averaged value against said remaining energy and means responsive to said balancing means for recording directly the amount of the desired component in the mixture.

6. In an apparatus for determining the amount of a desired component in a mixture by means of the characteristic infra-red absorption spectra of the desired component, means for directly recording the percentage of the desired component in the mixture comprising a plurality of slits for selecting a plurality of spectral bands characteristic of undesired components of said mixture and a single slit for selecting a band characteristic of the desired component of the mixture, a thermocouple behind each of said slits for converting said bands into electrical energy, a circuit including a resistance for connecting in series the thermocouples energized by the bands characteristic of the undesired components, a circuit including a galvanometer for balancing the current produced by the thermocouple energized by the band characteristic of the desired component with the current produced by the thermocouple energized by the bands characteristic of the undesired components through the mid-point of said resistance.

7. In an apparatus for determining the amount of a desired component in a mixture by means of the characteristic infra-red absorption spectra of the desired component, a plurality of slits for selecting a plurality of spectral bands characteristic of the undesired components of said mixture, a single slit for selecting a spectral band characteristic of the desired component of said mixture, thermocouples behind each slit for converting said spectral bands into electrical energy, means for obtaining an averaged value of the electrical energy developed by the thermocouples energized by the undesired components, means for balancing said averaged value against the energy developed in the thermocouple energized by the spectral band of the desired component, and mans responsive to said balancing means for indicating directly the percentage of the desired component.

8. In a thermocouple circuit the combination of a first circuit comprising a plurality of thermocouples connected in series through a resistance having a third contact at its mid-point, and a second circuit comprising a thermocouple connected through a galvanometer to said third contact and to said first thermocouple circuit positive to positive and negative to negative.

9. In a process for spectroscopically determining the percentage of isobutylene in a mixture, the steps comprising isolating a plurality of bands of infra-red radiation not characteristic of said isobutylene, isolating a single band of radiation characteristic of said isobutylene, converting each of said bands into electrical energy, averaging the energy obtained from the plurality of bands, balancing the average value thus obtained against the energy obtained from the single band and recording the result directly as percent isobutylene.

JOHN J. HEIGL.
JAMES A. WILSON.